United States Patent [19]
Dunn

[11] Patent Number: 5,317,860
[45] Date of Patent: Jun. 7, 1994

[54] COLLECTION DEVICE FOR GRASS CUTTING MACHINES

[75] Inventor: Ken Dunn, Darlington, England

[73] Assignee: Electrolux Northern Limited, England

[21] Appl. No.: 840,398

[22] Filed: Feb. 24, 1992

[30] Foreign Application Priority Data

Feb. 25, 1991 [GB] United Kingdom ............... 9103860

[51] Int. Cl.⁵ .................... A01D 34/70; A01D 87/10
[52] U.S. Cl. ...................... 56/12.8; 56/202; 56/DIG. 8
[58] Field of Search ............. 56/12.8, 12.9, 13.1, 56/13.3, 13.4, 16.6, DIG. 3, DIG. 8, 202

[56] References Cited

U.S. PATENT DOCUMENTS

| | | |
|---|---|---|
| 3,400,523 | 9/1968 | Klingofstrom et al. ... 56/DIG. 3 X |
| 3,706,189 | 12/1972 | Rutherford ............. 56/13.4 |
| 4,773,205 | 9/1988 | Hansen et al. .......... 56/13.3 |
| 5,113,642 | 5/1992 | Dunn ................... 56/12.8 |

Primary Examiner—David J. Bagnell
Attorney, Agent, or Firm—Pearne, Gordon, McCoy & Granger

[57] ABSTRACT

A grass cutting machine includes a grass cutter, a motor for driving the grass cutter, a housing for supporting the machine above ground datum, collector for collecting grass cut by cutter, and a fan for establishing a flow of air. The collector for cut grass further includes a duct for directing cut grass entrained in a stream of air from the fan. The duct has a collection mouth at an upstream end thereof and disposed in the region of the ground datum, thereof, and a downstream end of the duct connected to the collector. At least one air-outlet aperture is disposed in the region of the collection mouth, each aperture serving to direct at least a portion of the stream of air downstream from the collection mouth so as to draw into the mouth cut grass and to transport the cut grass through the duct to the collector.

29 Claims, 7 Drawing Sheets

COLLECTION DEVICE FOR GRASS CUTTING MACHINES

BACKGROUND OF THE INVENTION

This invention relates to grass cutting machines. Throughout this specification and claims, the term "grass cutting machine" is used to include domestic lawn mowers, grass cutting machines for cutting larger areas of grass such as sports fields and parkland as well as grass verge cutting equipment.

There are two main types of grass cutting machine currently in production namely (1) a machine including a cutting system rotatable about an axis which is substantially vertical relative to ground datum, and (2) a machine having a cylindrical cutting unit which includes a plurality of blades and which, in operation, is rotatable about an axis which is substantially parallel to ground datum, i.e. horizontal. Type (1) machines may be supported relative to ground datum by a cushion of air (commonly called a hover machine), by wheels (commonly called a wheeled rotary machine) or a combination thereof. A rear roller may also be used in order to produce a striped effect upon cut grass. Type (2) is normally supported on a combination of wheels and rollers. However, in one prior U.S. Pat. No. 4,738,086, there is described and claimed a type (2) machine which is supported on a cushion of air.

Collection of grass cut by any type of grass cutting machine is a problem confronting all design engineers in this field and, in our prior European Patent No. 0037971, B1 there is described and claimed a lawn mower of the type which in operation is supported by a cushion of air and has a knife rotatable about a vertical axis and a fan wheel rotatable about the same axis, the fan wheel and the knife being shrouded by a hood, the mower having a rim around the hood and the hood having one or more than one opening for air to the air cushion, characterized in that at least a part of the air stream to the fan wheel before reaching the fan wheel is used to pick up and transport grass, leaves and the like from the ground to a collecting chamber in the mower, the collecting chamber having means for separating grass from air.

SUMMARY OF THE INVENTION

According to one aspect of the present invention, a grass cutting machine comprises a grass cutter, a driving source for driving the grass cutter, means for supporting the machine above ground datum, a device for collecting grass cut by cutter, a source for establishing a flow of air, the device for collecting cut grass comprising a duct for directing cut grass entrained in a stream of air from the said source and from:
1. a collection mouth at an upstream end of the duct and disposed in the region of the ground datum and towards
2. a downstream end of the duct for collection by the collection device, at least one air-outlet aperture disposed in the region of the collection mouth, each aperture serving to direct at least a portion of the stream of air downstream from the collection mouth so as to draw into the mouth cut grass and transport the cut grass through the duct to the collection device.

According to a second aspect of the present invention, a grass cutting machine comprises a grass cutter, a driving source for driving the grass cutter, means for supporting the machine above ground datum, a device for collecting grass cut by cutter, a source for establishing a flow of air, the device for collecting cut grass comprising a duct for directing cut grass entrained in a stream of air from the said source and from:
1. a collection mouth at an upstream end thereof and disposed in the region of the ground datum and towards
2. a downstream end thereof for collection by the collection device, at least one air-outlet aperture disposed adjacent to the collection mouth, each aperture including a generally convexly shaped air flow control surface arranged so that at least a portion of the said stream of pressure air follows the air flow control surface and is directed downstream within the duct.

Collection of cut grass and other debris such as leaves is achieved by directing the stream of air through each air outlet as discussed below.

Each air outlet may or may not, as hereinafter discussed, include a generally convexly shaped air flow control surface. Where each aperture includes an air flow control surface, at least a portion of the air flow follows the contour of the air flow control surface by virtue of the boundary layer effect. By having a very smooth or even a faceted flow control surface, laminar air flow is achieved and the boundary layer of air adjacent to the surface is very thin. In this instance a streamlined flow of air over the air flow control surface results, and at least a major portion of the air flow follows the air flow control surface and enters said duct. Thus, a positive air flow is created by negative pressure along the duct away from the collection mouth, causing air to be drawn into the collection mouth together with any cut grass and loose material in the vicinity of the collection mouth. The lifting of any such cut grass and loose material is enhanced by the fact that any such material will be near to one particular region of the air flow control surface and the air thus increases speed in the gap between this one particular region and the material, causing a drop in air pressure in the gap, which drop in pressure pulls the loose material towards the air flow control surface, i.e. the material is lifted from the ground and into the duct via the collection mouth.

The cut grass and loose material is then as indicated above passed along the duct to a collection container at the down stream region of the duct, by the air flow, and as the duct is merely a passage with no fan or other auxiliary component causing at least a partial obstruction of a tortuous flow path, a relatively smooth path which facilitates the collection of a large variety of shapes and sizes of loose material.

If required, the duct may be furnished with outwardly flaring front and rear edge regions, each of which edge region is curved and ends in an air flow outlet. Each air flow outlet is connected to a motor driven fan or pump with the outlet designed so as to direct a flow of air at an inclined angle to the longitudinal axis of the duct, substantially along a smoothly curved surface, into the duct, part of the outlet merging with the smoothly curved surface and said smoothly curved surface merely merging with the continuous as the inside wall of the duct. As previously mentioned at least a major part of the air flow will follow the curved surface and enter the duct due to the boundary layer effect, the remainder of the air flow disturbing the loose material beneath the collection mouth and thus facilitating the loose material being drawn into the duct by the air flow. Whilst the front and rear edge regions of the collection mouth may be provided with curved surfaces and associated air flow outlets, solely the front or rear edge region may be so designed or alternatively one or other side edge regions may be additionally or alternatively so designed, as is required.

The collection container may be a disposable bag which can be easily detachably attached to the other end region of the duct with a filter outlet allowing the air flow to escape adjacent to the container, or alternatively a loose-woven bag may form the collection container obviating the need for a filter outlet.

Reference is drawn to copending UK Patent Application No. 9004075.7 which is imported in its entirety into this specification.

BRIEF DESCRIPTION OF THE DRAWINGS

Various grass cutting machines in accordance with the present invention will now be described by way of example with reference to the accompanying drawings; in which.

DETAILED DESCRIPTION OF THE PREFERRED EMBODIMENTS

Figure 1:
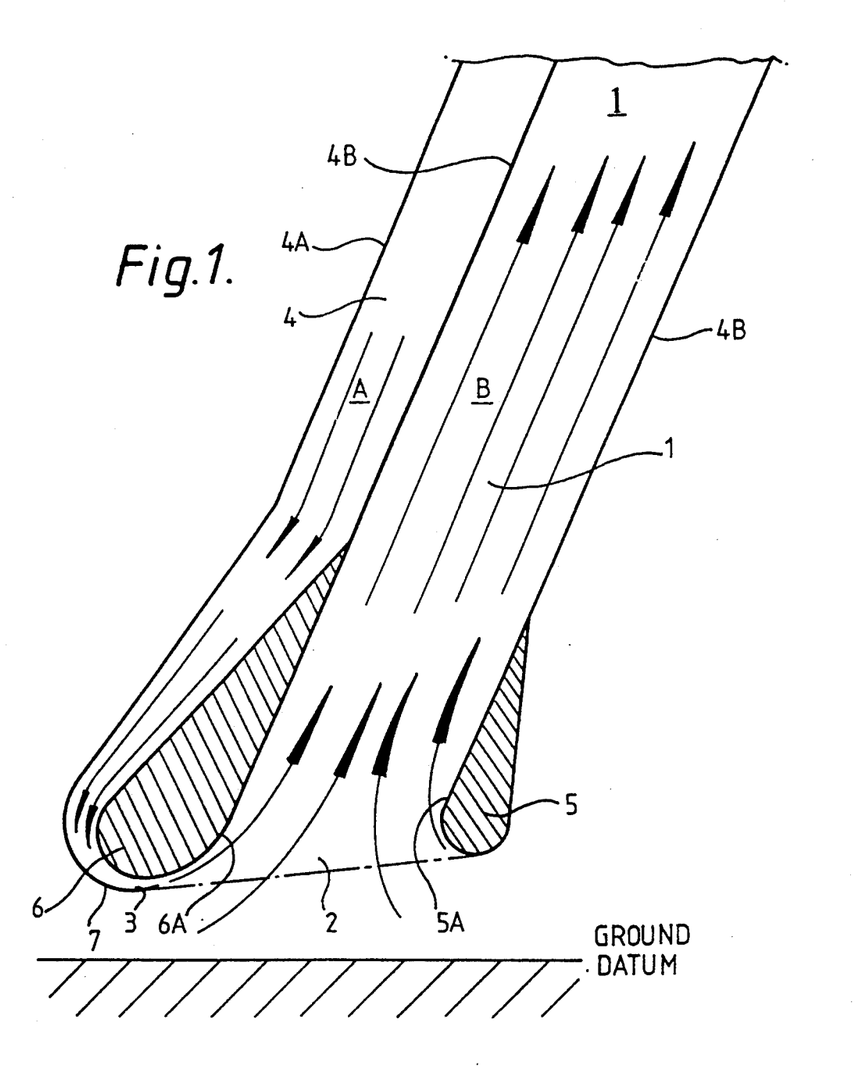
FIGS. 1, 1A and 1B illustrate in cross section a part of a duct and collection mouth suitable for use with the machines shown and described in conjunction with FIGS. 2 to 9.

Referring to FIG. 1 an elongate duct 1 presents a generally smooth internal surface for the passage of collected material from a collection mouth 2 disposed at an upstream end of the duct. The cross sectional shape of the duct 1 may be circular, rectangular, elliptical or polygonal. A plenum chamber 4 is constructed to at least partially surround the duct 1 and serves to direct pressure air in the direction of arrows A to an air outlet aperture 3. From FIG. 1 it will be seen that the collection mouth is furnished with two generally aerofoil shaped portions 5 and 6 and that the nose of aerofoil portion 6 constitutes a generally convexly shaped air flow control surface which defines at least a portion of the air outlet aperture 3 together with a further generally convexly curved confronting number 7. The shape of the air outlet aperture 3 or at least those surfaces leading to the aperture are arranged to direct an air flow generally over the nose of the aerofoil section 6 so as to cause the air to flow along and against the respective curved surfaces. Due to the boundary layer effect and the provision of a smoothly curved air flow control surface, laminar and streamed lined air flow results so that a major part of the air from the outlet follows the profile of the curved surfaces into the duct, the remaining air disturbing any loose material such as grass cuttings located beneath the collection mouth 2 and facilitating entrainment of this loose material into the air flow and along the duct 1 in the direction of arrows B for collection by a collecting device.

Figure 1A:
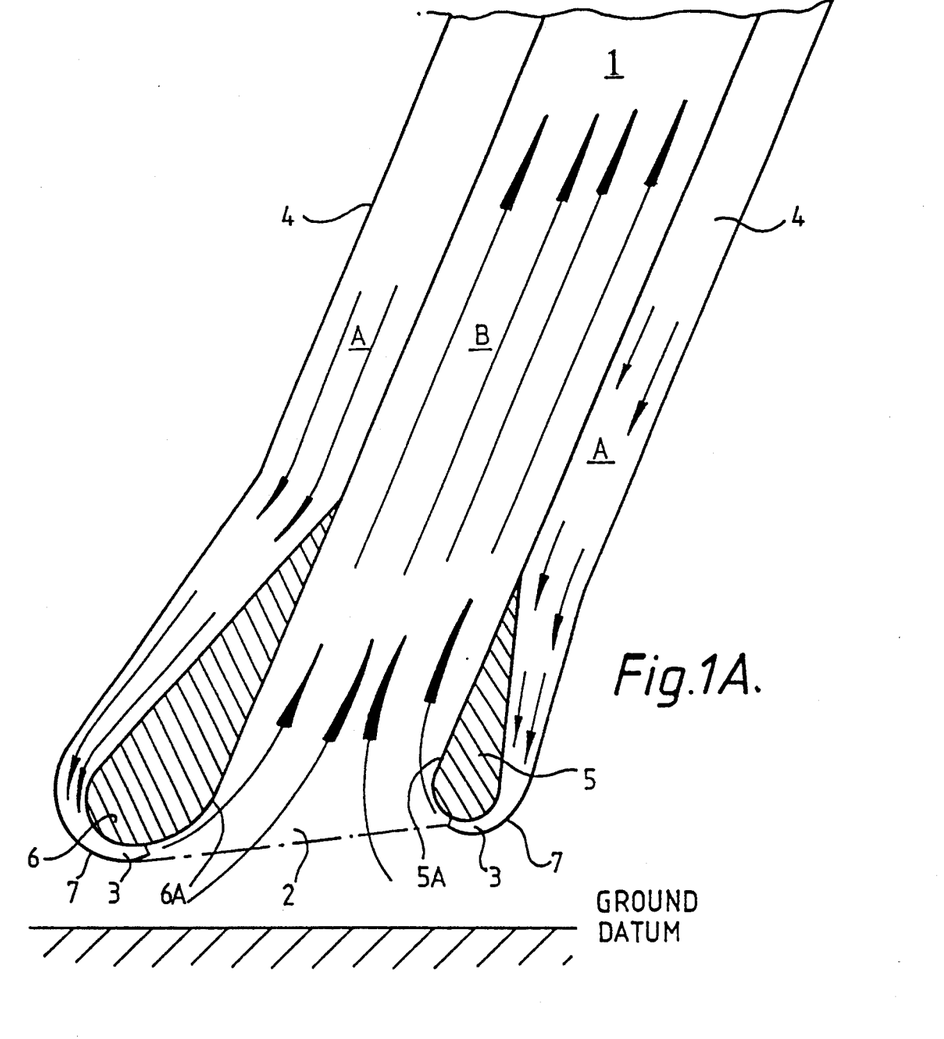

A plurality of air outlet apertures 3 may be disposed around the collection mouth in which case the plenum chamber 4 totally surrounds the elongate duct 1 and the collection mouth as shown in FIG. 1A in which like parts bear the same reference numbers as in FIG. 1. Entrainment of grass cuttings and other loose material into the elongate duct 1 is improved by the fact that the material will be closer to one part of the aerofoil sections mainly portions 5A and 6A than another. Thus the air flow through the gap remaining between the loose material and surfaces 5A and 6A will be increased causing a drop in air pressure in the gap and resulting in material being drawn nearer to the curved surfaces 5A and 6A, that is, lifted from the ground, so that the air flow into the duct 3 drawn in from atmosphere surrounding the collection mouth carries the material into and along the duct to the collection device.

Figure 1B:
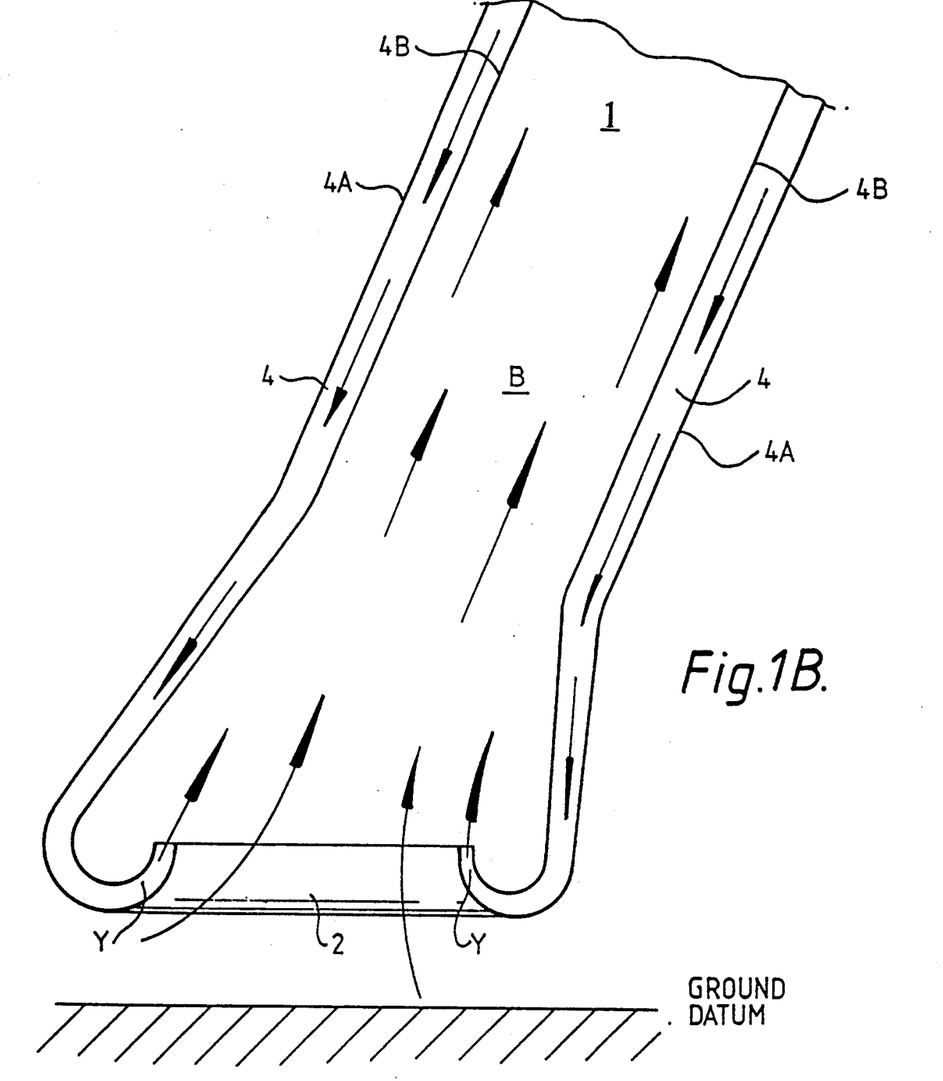

FIG. 1B is a modification FIG. 1A and shows an air outlet Y, extending around the total internal periphery of the collection mouth 2. If desired the air outlet Y may consist of a plurality of individual air outlet apertures spaced around the collection mouth. The outer 4A and the inner 4B walls of the plenum chamber 4 are so shaped so that air leaving the air outlet Y forms a curtain of air which is directed downstream of the duct 1. The inner 4B and outer 4A wall of the plenum chamber 4 may converge towards the aperture Y to produce a venturi effect. If desired, the angle of exit of the air outlet Y may be varied to direct the curtain of air downstream and outwardly towards the internal wall 4B of the plenum chamber 4 which defines duct 1 or inwardly towards the longitudinal axis of the duct 1.

Figure 2:
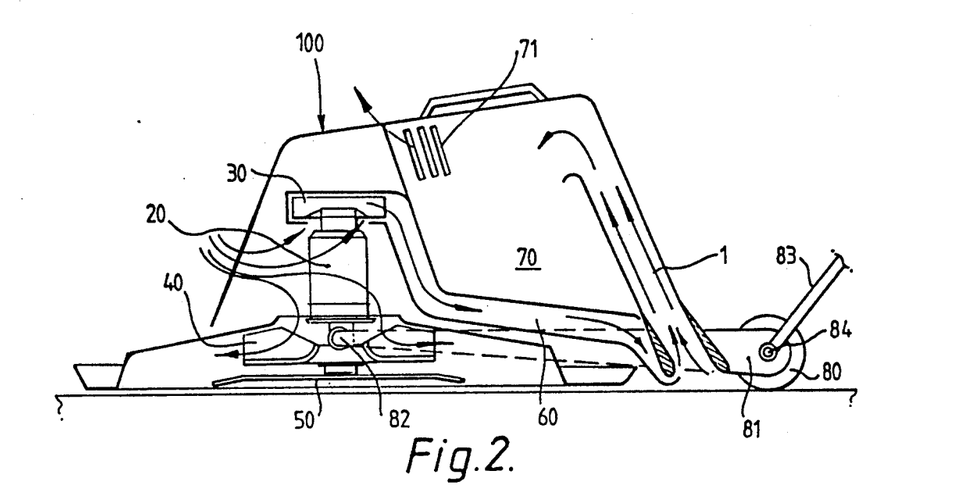
FIGS. 2 and 3 show, in longitudinal cross section, hover-type lawn mowers including the collection device of FIG. 1.

FIG. 2 shows, in longitudinal cross section, a hover-type lawn mover having a good 100 in which a motor 20 which drives first and second fans 30 and 40 and a cutting blade 50 are coaxially mounted on the motor shaft. Air generated by the fan 40 produces a cushion of air for supporting the mower whereas air generated by the fan 30 is led via ducting 60 to a grass collection device described with reference to FIG. 1 and disposed abaft the hood 100 as shown. Grass cuttings and other litter, is, as described with reference to FIG. 1, transported downstream within the duct 1 into a removable collector 70 which includes ventilation slots 71. In order to product a striped effect a roller 80 is carried by two booms (of which only one is shown) 81 pivotally mounted about a transverse horizontal axis 82 which passes through the motor shaft. A handle 83 is supported from roller axle 84 for controlling operation of the mower.

Figure 3:
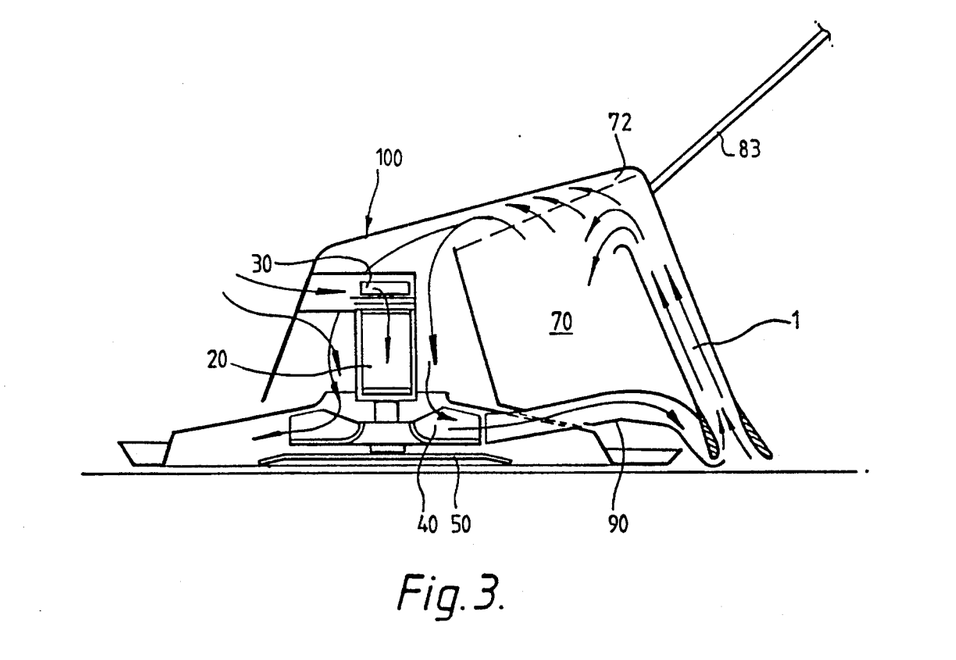

FIG. 3 shows a modification of the power of FIG. 2 in which similar components bear the same reference numbers. In contrast to the mower of FIG. 2, air from the fan 30 is used for cooling the water whereas a proportion of the air from the 40 is diverted through ducting 90 towards duct 1 of the collection device described with reference to FIG. 1. Pressure air reaching the removable collector 70 is drawn through a grating or sieve 72 by the fan 40.

Figure 4:
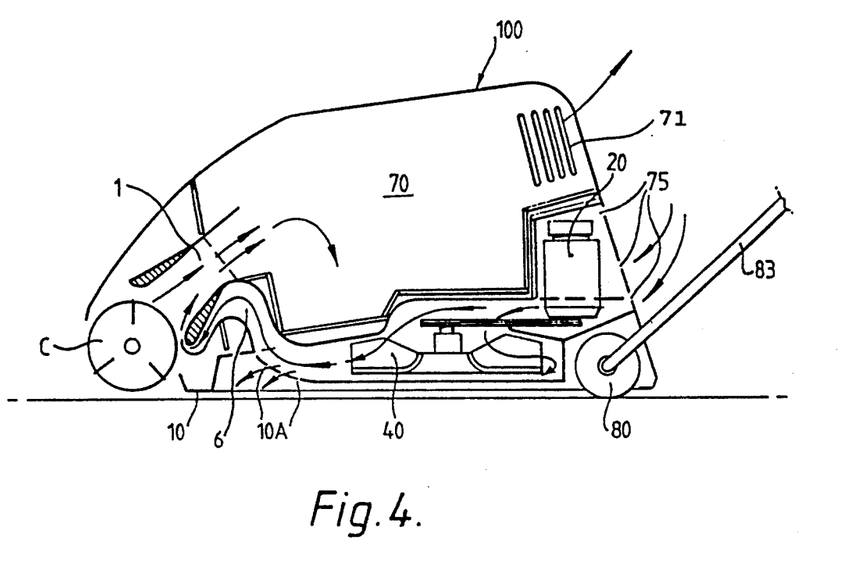
FIGS. 4 and 5 shown, in longitudinal cross section, a mower having a cylindrical cutting unit and supported by a cushion of air.
Figure 5:
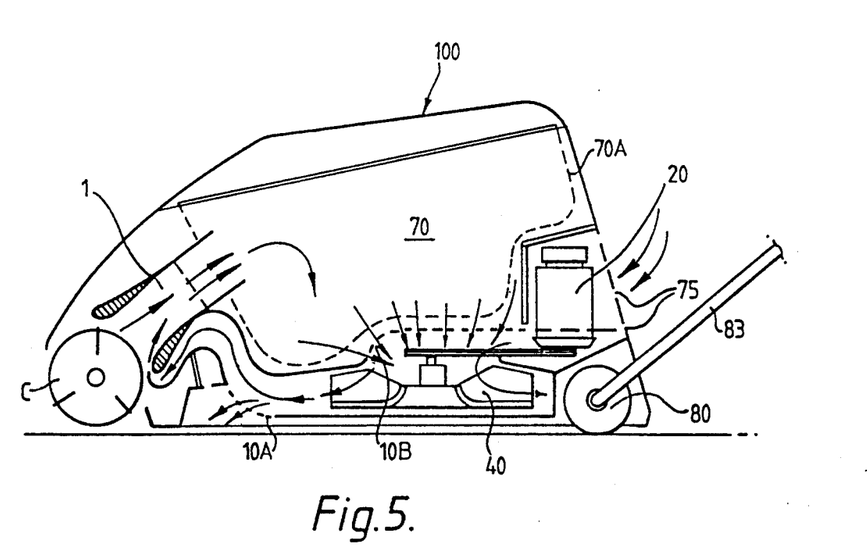

FIGS. 4 and 5 each illustrate a mower having a cylindrical cutter C mounted at the forward end of the mower which is supported on a cushion of air. Where appropriate, the same reference numbers used in previous Figures are again used for similar components. In contrast to the mower of FIGS. 2 and 3, the fan 40 of FIGS. 4 and 5 is indirectly driven by a belt, gear of other drive line by the motor 20 which is housed towards the rear of the hood 100. The fan 40 of the embodiment of FIG. 4 draws external air through a grid 75 to:

cool the motor 20;
establish a cushion of air to support the mower by passing through apertures 10A in the hood 10, and to a collection duct 1 via ducting 6 into the collector 70, which as described with reference to FIG. 2, includes ventilating apertures 72.

A roller 80 and handle 83 are mounted to the rear of the hood 100 as indicated.

The embodiment of FIG. 5 differs from that of FIG. 4 in that the grass collector is a perforated bag 70A or other unit so that pressure air entering the bag from the collection duct 1 is drawn therefrom via perforations 10B by the fan 40.

Figure 6:
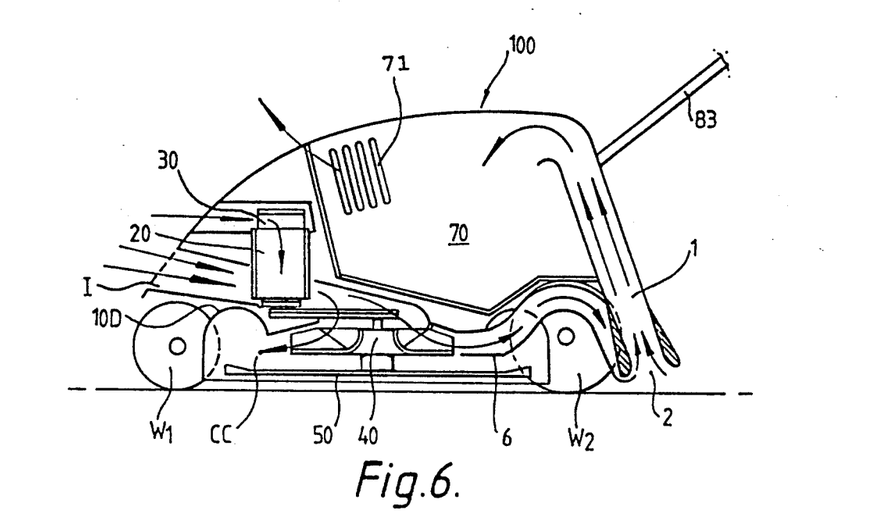
FIGS. 6 and 7 show, in longitudinal cross section, two forms of wheeled rotary mower including a collection device as shown in FIG. 1 and FIGS. 8 and 9 show, in longitudinal cross section, a ride on grass cutting machine used for cutting large areas of grass and including a grass collector attachment as shown in FIG. 1A.
Figure 7:
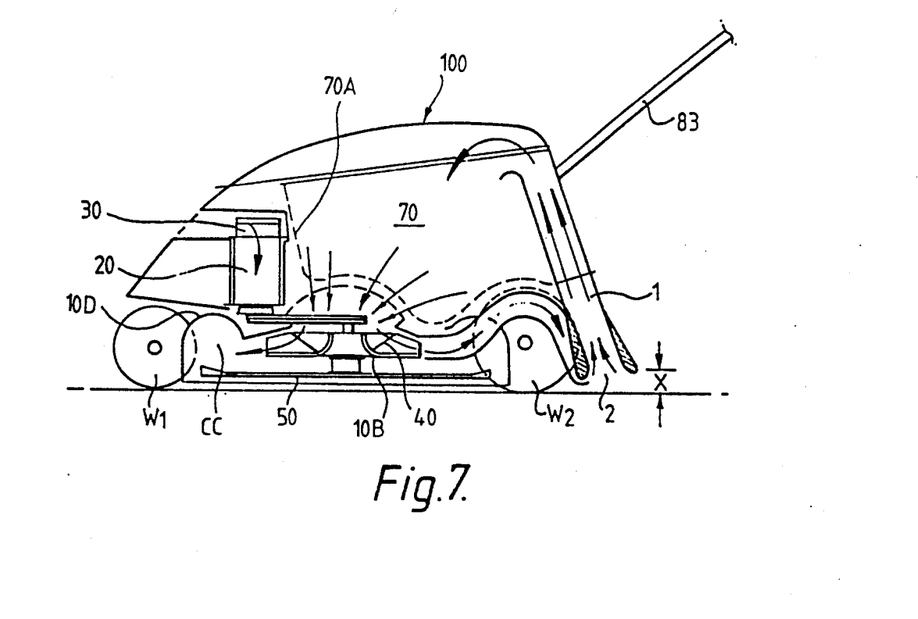

FIGS. 6 and 7 show two rotary mowers which are supported on four wheels of which one forward wheel W1 and one rearward wheel W2 may be replaced by a split or one piece roller in order to produce a striped effect upon a cut lawn. The cutting blade 50 and fan 40 are coaxially mounted on a common vertical shaft which is indirectly driven by the motor 20. A cooling motor fan 30 mounted above the motor serves to augment incoming external air drawn by the fan 40 via inlet I. In addition to a certain amount of pressure air entering cutting chamber CC, pressure air from the fan 40 is led via ducting 6 to the collection duct 1 in the manner previously described with reference to FIG. 2 into collector 70 which includes ventilator slots 71.

The embodiment of FIG. 7 operates on similar principles to that previously described with reference to FIG. 5 in that pressure air is drawn from a perforated grass collector bag 70A or other unit via apertures 10B in a portion of the hood 100 above the fan 40.

The position of collector mouth 2 of the collection duct, dimensions "X" FIG. 7, may be raised according to pick-up conditions and the condition of the grass, for example, short or long grass, and wet or dry grass. The dimension "X" may be raised by constructing the collection duct 1 as a telescopic unit or means such as a parallel or other linkage or a mechanism for raising/-lowering the duct perse may be used. If desired, the above means for varying the positions of the collection mouth may be fused in any of the machines according to the present invention.

The mowers of FIGS. 6 and 7 have, as indicated, a conventional semi-corroded cutting chamber CC formed within a cast or moulded chassis 10D.

Figure 8:
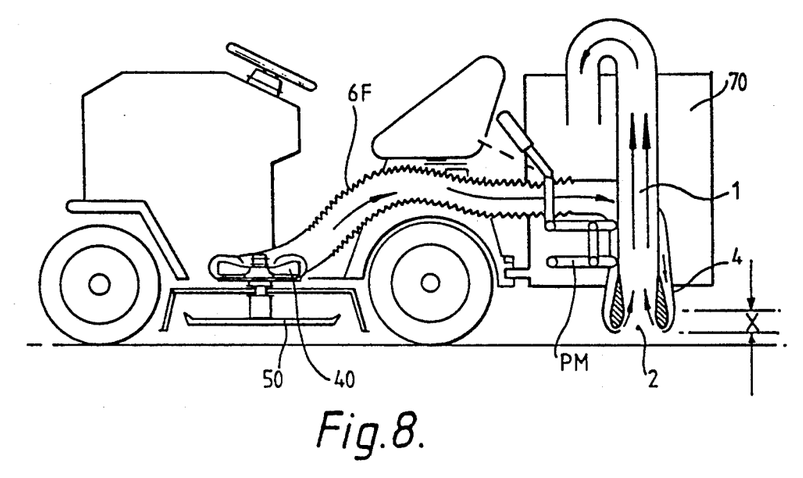
Figure 9:
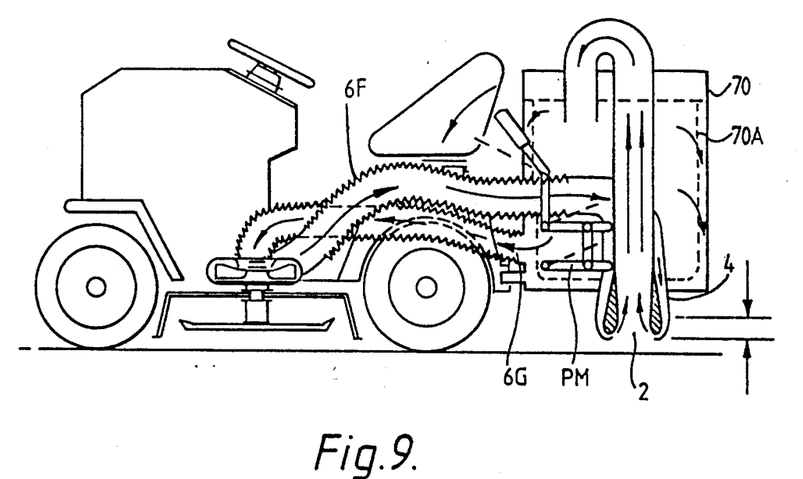

FIGS. 8 and 9 illustrate the use of a collection device in accordance with FIG. 1 and constructed as an attachment for a ride-on grass cutting machine. In the embodiment of FIG. 8 grass and other debris exists from the collector duct 1 into a removable collection container 70.

Pressure air generated by a fan 40 drive by the power source of the machine is fed to the collection unit 70 via flexible ducting 6F. A parallel linkage mechanism PM permits variation of the position of the collection mouth 2 relative to ground datum.

The embodiment of FIG. 9 operates on a principle similar to that previously described with reference to FIGS. 5 and 7 in which the collection bag or unit 70A is perforated and air therefrom is drawn back to the fan 40 via ducting 6G.

In the foregoing description with reference to FIGS. 2 to 7, the plenum chamber 4 is disposed around a portion of the exterior of the collection duct 1. Alternatively, the plenum chamber may totally surround the collection duct as illustrated in FIGS. 1A and 1B. It will, therefore, be appreciated that the construction shown in FIGS. 1, 1A and 1B are interchangeable.

I claim:

1. A grass cutting machine comprising a grass cutter, a driving source for driving said grass cutter, means for supporting said machine above ground datum, collecting device for collecting grass cut by said grass cutter and a source for establishing a flow of air, the said collecting device comprising a duct having an upstream end and a downstream end, said upstream end having a collection mouth disposed to receive grass cut by said grass cutter, the collection mouth including a plurality of apertures for receiving the flow of air from said source, each aperture including a generally convexly-shaped air flow control surface arranged so that at least a portion of said flow of air follows said control surface to be directed at an angle inclined towards the longitudinal axis of the duct in the downstream direction.

2. A grass cutting machine according to claim 1 having a plenum chamber disposed externally of said duct and receiving said flow of air and supplying it to each aperture.

3. A grass cutting machine according to claim 1 having two said apertures disposed opposite each other, whereby air streams issuing from said apertures converge inwardly towards a central zone of said duct.

4. A machine according to claim 1 wherein the means for supporting said machine above ground datum is a cushion of air and the grass cutter includes a cutter rotatable about an axis which is substantially vertical relative to ground datum.

5. A machine according to claim 4 including a hood which shrouds the cutter, a first fan for establishing a cushion of air for supporting the machine above ground datum, a second fan for establishing a separate source of pressure air, and a duct for leading pressure air from said second fan to each air outlet aperture.

6. A machine according to claim 5 wherein the collection mouth is disposed abaft, when considered in the direction of normal cutting by the machine, the axis of rotation of the grass cutting system.

7. A machine according to claim 5 wherein the collection mouth is disposed externally of a hood which shrouds the cutter.

8. A machine according to claim 5 wherein the collection mouth is disposed within a hood which shrouds the cutter.

9. A machine according to claim 5 wherein the driving source includes a driving shaft and wherein the first and second fans and the cutter are mounted coaxially with the driving shaft.

10. A machine according to claim 1 wherein the downstream end of said duct opens into a collection device which is detachably support on the machine.

11. A machine according to claim 1 in which the collection device includes a screen through which air form the downstream end of said duct is recirculated to said air source.

12. A machine according to claim in which said grass cutter is a cylinder cutter rotatable about a horizontal axis and said means for supporting the machine above ground datum includes, rollers or castors.

13. A machine according to claim 11 including means for diverting a portion of pressure air from the chamber to beneath the mower to assist support thereof relative to ground datum.

14. A machine according to claim 1 in which the machine is a ride-on wheeled machine including an attachment comprising the collecting device, the duct and the apertures for detachably mounting the collection device on the machine and means for directing cut grass from the duct into a container, means for adjusting the height of the collection mouth relative to ground datum and means for connecting each said aperture to a fan for producing the source of air.

15. A machine according to claim 14 in which air is recirculated from the container to the source of air flow.

16. A grass cutting machine comprising a housing, a cutting chamber disposed within the housing, a grass cutter rotatably mounted within the cutting chamber, a driving source for driving said grass cutter, means for supporting said machine above ground datum, a collecting device for collecting grass cut by said grass cutter and a source for establishing a flow of air, the said collecting device comprising a duct disposed externally of the cutting chamber having an upstream end and a downstream end, said upstream end having a collection mouth disposed externally of the housing to receive grass cut by said grass cutter and deposited on ground data, the collection mouth including at least one aperture for discharging the flow of air from said source, each said aperture including a generally convexly shaped air flow control surface arranged so that at least a portion of said flow of air follows said control surface to be directed at an angle inclined towards the longitudinal axis of the duct in the downstream direction so that said flow of air draws cut grass into the duct from a position external of the housing.

17. A grass cutting machine according to claim 16 including a plurality of apertures and respectively associated convexly shaped air flow control surfaces.

18. A grass cutting machine according to claim 16 having a plenum chamber disposed externally of said duct and receiving said flow of air and supplying it to each aperture.

19. A grass cutting machine according to claim 16 having two said apertures disposed opposite each other, whereby air streams issuing from said apertures converge inwardly towards a central zone of said duct.

20. A grass cutting machine according to claim 16 wherein the means for supporting said machine above ground datum is a cushion of air and the grass cutter includes a cutter rotatable about an axis which is substantially vertical relative to ground datum.

21. A grass cutting machine according to claim 20 including a hood which shrouds the cutter, a first fan for establishing a cushion of air for supporting the machine above ground datum, a second fan for establishing a separate source of pressure air, and a duct for leading pressure air from said second fan to each air outlet aperture.

22. A grass cutting machine according to claim 21 wherein the collection mouth is disposed abaft, when considered in the direction of normal cutting by the machine, the axis of rotation of the grass cutting system.

23. A grass cutting machine according to claim 21 wherein the driving source includes a driving shaft and wherein the first and second fans and the cutter are mounted coaxially with the driving shaft.

24. A grass cutting machine according to claim 16 wherein the downstream end of said duct opens into a collection device which is detachably supported on the machine.

25. A grass cutting machine according to claim 16 in which the collection device includes a screen through which air from the downstream end of said duct is recirculated to said air source.

26. A grass cutting machine according to claim 25 including means for diverting a portion of pressure air from the chamber to beneath the mower to assist support thereof relative to ground datum.

27. A grass cutting machine according to claim 16 in which said grass cutter is a cylinder cutter rotatable about a horizontal axis and said means for supporting the machine above ground datum includes rollers or castors.

28. A grass cutting machine according to claim 16 in which the machine is a ride-on wheeled machine including an attachment comprising the collection device, the duct, and said at least one aperture for detachably mounting the collection device on the machine and means for directing cut grass from the duct into a container, means for adjusting the height of the collection mouth relative to ground datum and means for connecting each said aperture to a fan for producing the source of air.

29. A grass cutting machine according to claim 28 in which air is re-circulated from the container to the source of air flow.

* * * * *

UNITED STATES PATENT AND TRADEMARK OFFICE
CERTIFICATE OF CORRECTION

PATENT NO. : 5,317,860　　　　　　　　　　　Page 1 of 2
DATED : June 7, 1994
INVENTOR(S) : Ken Dunn It is certified that error appears in the above-identified patent and that said Letters Patent is hereby corrected as shown below:

Column 1, line 31 and 32, delete "European Patent No. 0037971" and insert --European Patent No. 0037871--.

Column 2, line 63, delete "continuous" and insert --continuing--.

Column 3, lines 14 and 15, delete "UK Patent Application No. 9004075.7" and insert --UK Patent Application No. 9004076.7--;

line 30, delete "shown" and insert --show--; and line 45, after "material" insert --therethrough--.

Column 4, line 37, delete "mover" and insert --mower--;

line 37, delete "good" and insert --hood--;

line 48, delete "product" and insert --produce--;

line 54, delete "power" and insert --mower--; and line 57, delete "water" and insert --motor--.

Column 5, line 48, delete "fused" and insert --used--; and line 59, delete "drive" and insert --driven--.

Column 6, line 6, delete "construction" and insert --constructions--;

UNITED STATES PATENT AND TRADEMARK OFFICE
CERTIFICATE OF CORRECTION

PATENT NO. : 5,317,860

DATED : June 7, 1994

INVENTOR(S) : Ken Dunn

It is certified that error appears in the above-identified patent and that said Letters Patent is hereby corrected as shown below:

Column 6, line 60 (Claim 10, line 3), delete "support" and insert --supported--;

line 63 (Claim 11, line 3), delete "form" and insert --from--;

line 65 (Claim 12, line 1), after "claim" insert --1--; and line 68 (Claim 12, line 4), after "includes" delete --,-- (comma).

Signed and Sealed this

Sixth Day of September, 1994

*Attest:*

BRUCE LEHMAN

*Attesting Officer*    *Commissioner of Patents and Trademarks*